United States Patent [19]

Fukuzumi

[11] Patent Number: 5,737,571
[45] Date of Patent: Apr. 7, 1998

[54] SYSTEM FOR DISCRIMINATING THAT AN EXTERNAL PROCESSOR IS PERMITTED TO ACCESS A DATA STORAGE DEVICE UTILIZING PRESCRIBED CONTROL SIGNALS INCLUDING ACCESS ENABLE SIGNAL

[75] Inventor: Tomoya Fukuzumi, Tokyo, Japan

[73] Assignee: Mitsubishi Denki Kabushiki Kaisha, Tokyo, Japan

[21] Appl. No.: 581,497

[22] Filed: Dec. 29, 1995

[30] Foreign Application Priority Data

Aug. 24, 1995 [JP] Japan ................... 7-215759

[51] Int. Cl.$^6$ .................. G06F 15/20; G06F 12/14
[52] U.S. Cl. ............ 395/479; 395/856; 395/490; 395/833
[58] Field of Search .................. 380/23, 25; 395/800, 395/186, 282, 490, 479, 843, 856, 833

[56] References Cited

U.S. PATENT DOCUMENTS

| | | | |
|---|---|---|---|
| 4,777,355 | 10/1988 | Takahira | 235/380 |
| 5,252,812 | 10/1993 | Nakamura | 235/380 |
| 5,293,424 | 3/1994 | Holtey et al. | 380/23 |
| 5,319,765 | 6/1994 | Kimura | 395/425 |
| 5,442,704 | 8/1995 | Holtey | 380/23 |
| 5,461,675 | 10/1995 | Diehl et al. | 380/23 |
| 5,491,827 | 2/1996 | Holtey | 395/800 |
| 5,509,076 | 4/1996 | Sprunk | 380/25 |
| 5,513,261 | 4/1996 | Maher | 380/23 |

*Primary Examiner*—Thomas C. Lee
*Assistant Examiner*—Rehana Perveen

[57] ABSTRACT

A data processing system comprises an IC card and a personal computer connected to each other with a connector. The IC card includes a data storage section for storing data, and a control section for controlling the data storage section according to control signals received from the personal computer. When the IC card is connected to the personal computer, the IC card is operated after the personal computer sends an access signal to the IC card. In a modified example, the personal computer sends signals in a prescribed sequence, and the IC card is operated after the IC card detects that the signals are received in a prescribed sequence.

18 Claims, 8 Drawing Sheets

SYSTEM FOR DISCRIMINATING THAT AN EXTERNAL PROCESSOR IS PERMITTED TO ACCESS A DATA STORAGE DEVICE UTILIZING PRESCRIBED CONTROL SIGNALS INCLUDING ACCESS ENABLE SIGNAL

BACKGROUND OF THE INVENTION

1. Field of the Invention

The present invention relates to a data storage device such as an IC card having a security function against data stored therein, and to a data processing system comprising such a data storage device and a data processor such as an office automation equipment, a personal computer, or the like having a security function compatible with that of the data storage device.

2. Description of the Prior Art

Recently, an IC card comprising a memory IC is used as an external storage device, in addition to a floppy disk, a hard disk, a magneto-optical disk or the like for a data processor such as an office automation equipment or a personal computer. In a data processing system comprising the IC card and the data processor, when the IC card and the data processor generally use a general interface standard, the data stored in the IC card can be read out by all the data processors using the same interface standard. As a result, it is a problem that the data storage device and the data processing system cannot maintain security of data stored in the IC card.

SUMMARY OF THE INVENTION

A first object of the present invention is to provide a data storage device having a security function to protect data stored therein.

In a first aspect of the present invention, a data storage device such as an IC card has a connector detachably connected to an external data processor such as a personal computer. A transmission controller generates a signal when an access enable signal is received from the external data processor through said connector. When the signal is received, a storage controller supplies prescribed control signals for controlling a data storage section. Thus, if the external data processor cannot generate the access enable signal, it cannot access the data storage device.

In a second aspect of the invention, a data storage device comprises a gate passing prescribed control signals received from a connector to a data storage section. The gate is controlled by a gate controller according to an access enable signal received from the external data processor. Thus, if the external data processor does not have a function to generate the access enable signal, it cannot access the data storage device. The access enable signal may be generated when a signal is supplied by the data storage device to the external data processor. It is also possible to supply the signal after another signal is received from the external data processor to the data storage device.

In a third aspect of the invention, a data storage device also comprises a gate passing prescribed control signals received from the external data processor to a data storage section. The gate is controlled by a gate controller according to signals received in a prescribed sequence. That is, if the gate controller detects that first and second signals are received in the prescribed sequence, it activates the gate to pass the prescribed control signals to the data storage section. Thus, if the external data processor does not have a function to supply the first and second signals in the prescribed sequence, it cannot access the data storage device. For example the gate controller comprises a timer operated by two signals which starts the timer and confirms the sequence after starting the timer.

The first and second signals are generated in various ways. In a modified way, when the data storage device is connected to the external data processor, the data processor sends a signal to the data storage device to return an access signal to the external data processor, or the data storage device sends an interrupt signal to the external data processor. Then, the external data processor supplies the first and second signals in a prescribed sequence. Thus, the security of the data storage device can be maintained more effectively.

In a different way, the data storage device further comprises an address decoder which generates the first or second signal when it receives prescribed first or second address signals from the connector. If the data processor cannot supply the prescribed address, it cannot access the IC card.

An advantage of the present invention is that the data stored in the data storage device can be protected effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
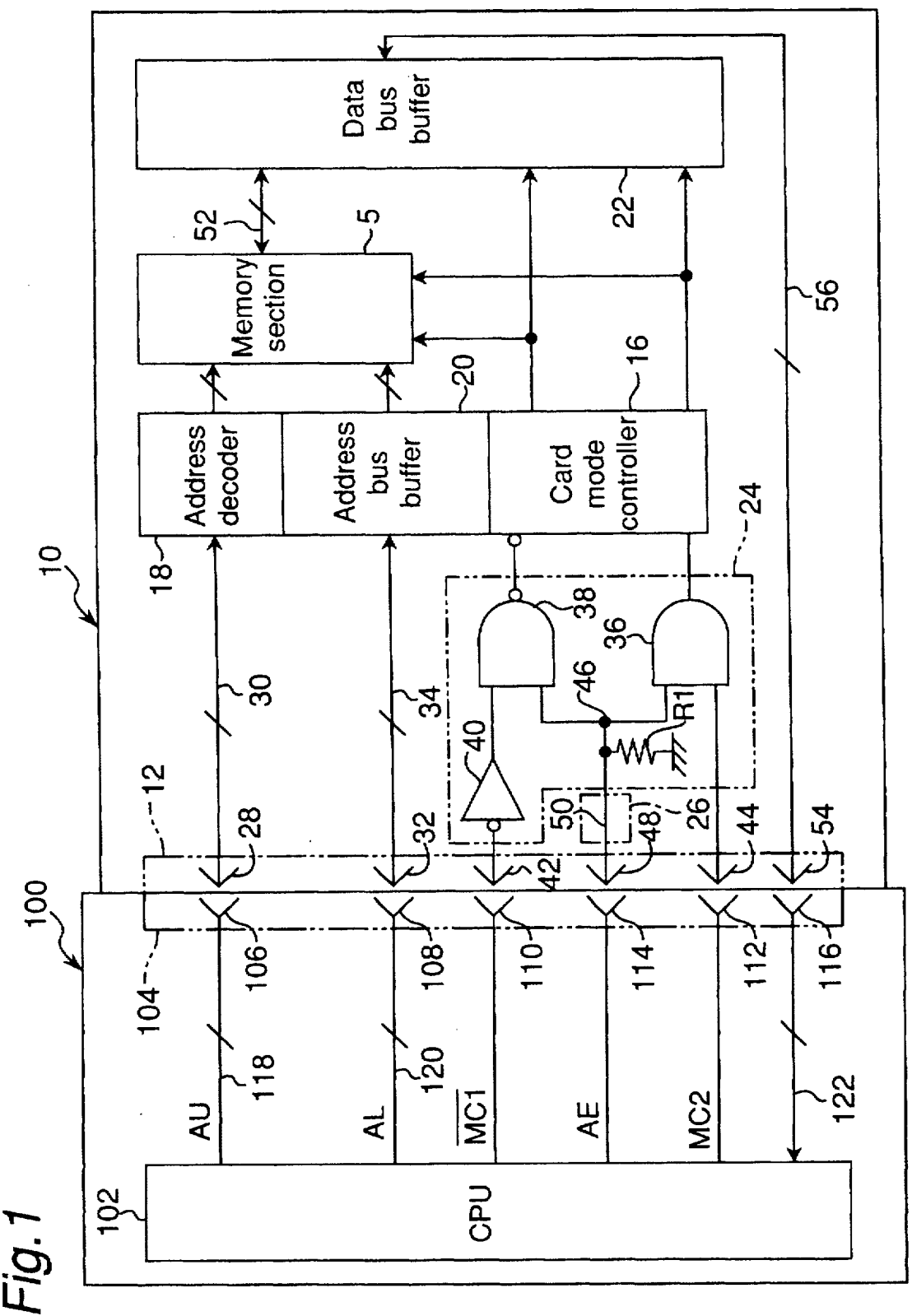
FIG. 1 is a block diagram of a data processor system of a first embodiment according to the present invention.

Referring now to the drawings, wherein like reference characters designate like or corresponding parts throughout the views, FIG. 1 shows a data processing system of a first embodiment of the present invention wherein an IC card 10 is connected to a personal computer 100. The personal computer 100 has a connector 104 according to a prescribed interface standard, and a connecting section 12 of the IC card 10 is detachably connected to a card slot provided in the connector 104.

The IC card 10 comprises a memory section 5 composed of a plurality of memory devices for storing data, a card mode controller 16 for controlling the operation of the memory section 5, an address decoder 18 and an address bus buffer 20 for supplying an address to the memory section 14, and a data bus buffer 22 for temporarily storing data written to the memory section 5 or read therefrom.

The IC card 10 further comprises a gate circuit 24 for controlling the supply of mode control signals $\overline{MC1}$ MC2 to the card mode control section 16, and a detector circuit 26 for detecting an identification signal entered from the personal computer 100.

To the address decoder 18, higher bits of an address signal (hereinafter, referred to as address signal AU) are fed from a CPU 102 in the personal computer 100 through an address bus 118, a connector terminal 106 of the connector 104, a connecting terminal 28 of the connecting section 12 of the IC card 10, and an address bus 30. Thus, the address decoder 18 selects one of the memory devices in the memory section 5 in correspondence to the address signal AU. Further, to the address bus buffer 8, lower bits of an address signal (hereinafter, referred to as address signal AL) are supplied from the CPU 102 of the personal computer 100 through an address bus buffer 120 of the personal computer 100, a connector terminal 108 of the connector 104, a connecting terminal 32 of the connecting section 12 of the IC card 10, and an address bus 34. Thus, the address bus buffer 20 designates the address of the memory device in correspondence to the address signal AL.

The gate circuit 24 comprises an AND gate 36, a NAND gate 38, an inverter 40, and a pull-down register $R_1$. The inverter 40 is connected to a connecting terminal 42 of the connecting section 12 of the IC card 10. The connecting terminal 42 is connected to a terminal 110 of the connector 104 of the personal computer 100, and the terminal 110 receives the mode control signal $\overline{MC1}$ from the CPU 102 of the personal computer 100.

An output of the inverter 40 is entered to an input terminal of the NAND gate 38, while an input terminal of the AND gate 36 is connected to a terminal 44 of the connecting section 12 of the IC card 10. The connecting terminal 42 is connected to a connector 110 of the personal computer 100, and the connector 112 receives an input of the other mode control signal MC2 from the CPU 102 in the personal computer 100.

The other input terminal of the NAND gate 38 and the other input terminal of the AND gate 36 are connected to each other at a point 46, which is also connected to a pull-down register $R_1$ connected to the ground. The connection point 46 and a terminal 48 of the connecting section 12 of the IC card 10 are connected to each other by a wire line 50 or transmission line 50 which plays a role of a circuit 26 to supply the identification signal to the gate circuit 24 in the example. The terminal 48 is connected to a counterpart terminal 114 of the connector 104 of the personal computer 100. To the terminal 114, an identification signal (access enable signal) AE is fed from the CPU 102 of the personal computer 100.

The signal AE shows that the personal computer 100 is a specific personal computer that is allowed to access the IC card. The connector 104 and the connecting section 12 have terminals in correspondence to a general interface standard, but the terminals 48 and 114 used for transmitting the identification signal AE are terminals not defined in the general interface standard. Therefore, if the personal computer 100 does not have the terminal 114 for the security function according to this embodiment, it cannot send the identification signal to the IC card 10, or it cannot access the IC card 10.

An output of the AND gate 36 and an output of the NAND gate 38 are entered to the card mode control section 16. A data read/write control signal outputted from the card mode control section 16 is entered into the memory section 5 and the data bus buffer 22. The data bus buffer 22 is connected to the memory section 5 through a data bus 52, and further connected to a prescribed connecting terminal 54 of the connecting section 12 of the IC card 10 through a data bus 56. A connector terminal 116 of the connector 104 of the personal computer 100 is connected to the connecting terminal 54, while a data bus 122 of the CPU 102 is connected to the connector terminal 116.

In the data processing system shown in FIG. 1, the IC card 10 and the personal computer 100 have security function compatible with each other. That is, the IC card 10 comprises the identification signal detector circuit 26 for identifying the signal AE, and the gate circuit 24 for controlling the passage of the mode control signals $\overline{MC1}$ and MC2, while the CPU 102 in the personal computer 100 outputs the identification signal AE. Then, when a user connects the connecting section 12 of the IC card 10 to the connector 104 of the personal computer 100, the user can read out data from the IC card 10 as explained below.

The CPU 102 in the personal computer 100 sends an "H" level of the identification signal AE to the connector terminal 114 of the connecting section 12. This means that the personal computer 100 is a personal computer having the security function which is indented to access the IC card 10 having the security function. The identification signal AE is entered from the terminal 114 of the connector 104 to the terminal 48 of the connecting section 12 of the IC card 10, and then entered to the other input terminal of each of the AND gate 36 and the NAND gate 38 of the gate circuit 24 through the wire line 50 of the identification signal detector circuit 26. As a result, the NAND gate 38 and the AND gate 36 are opened so that the mode control signals $\overline{MC1}$ and MC2 received from the personal computer 100 are passed to the card mode control section 16. Thus, the access of the IC card 10 by the personal computer 100 is enabled.

On the other hand, when a general user, who has a personal computer that does not output the identification signal AE, who has the IC card 10 and who has connected its connecting section 12 to a connector of the general personal computer, the CPU of the general personal computer will not send the identification signal AE to the IC card 10. Also, the other terminals of each of the AND gate 36 and the NAND gate 38 are grounded by the pull-down resistor $R_1$ so as to be kept at "L" level. Therefore, the NAND gate 38 and the AND gate 36 are closed, so that it is disabled for the general personal computer to access the IC card 10 with the mode control signals $\overline{MC1}$ and MC2. Accordingly, even if a general user has the IC card 10 and intends to read its data by his or her own personal computer, the user cannot access the data from the IC card 10.

In the IC card 10 shown in FIG. 1, the identification signal detector circuit 26 comprises a transmission line to supply the identification signal AE to the gate circuit 24. However, a person skilled in the are may find various modifications. For example, switches which are closed or opened by the identification signal AE may be provided between the terminals 42 and 44 and the two inputs of the card mode controller 16.

Figure 2:
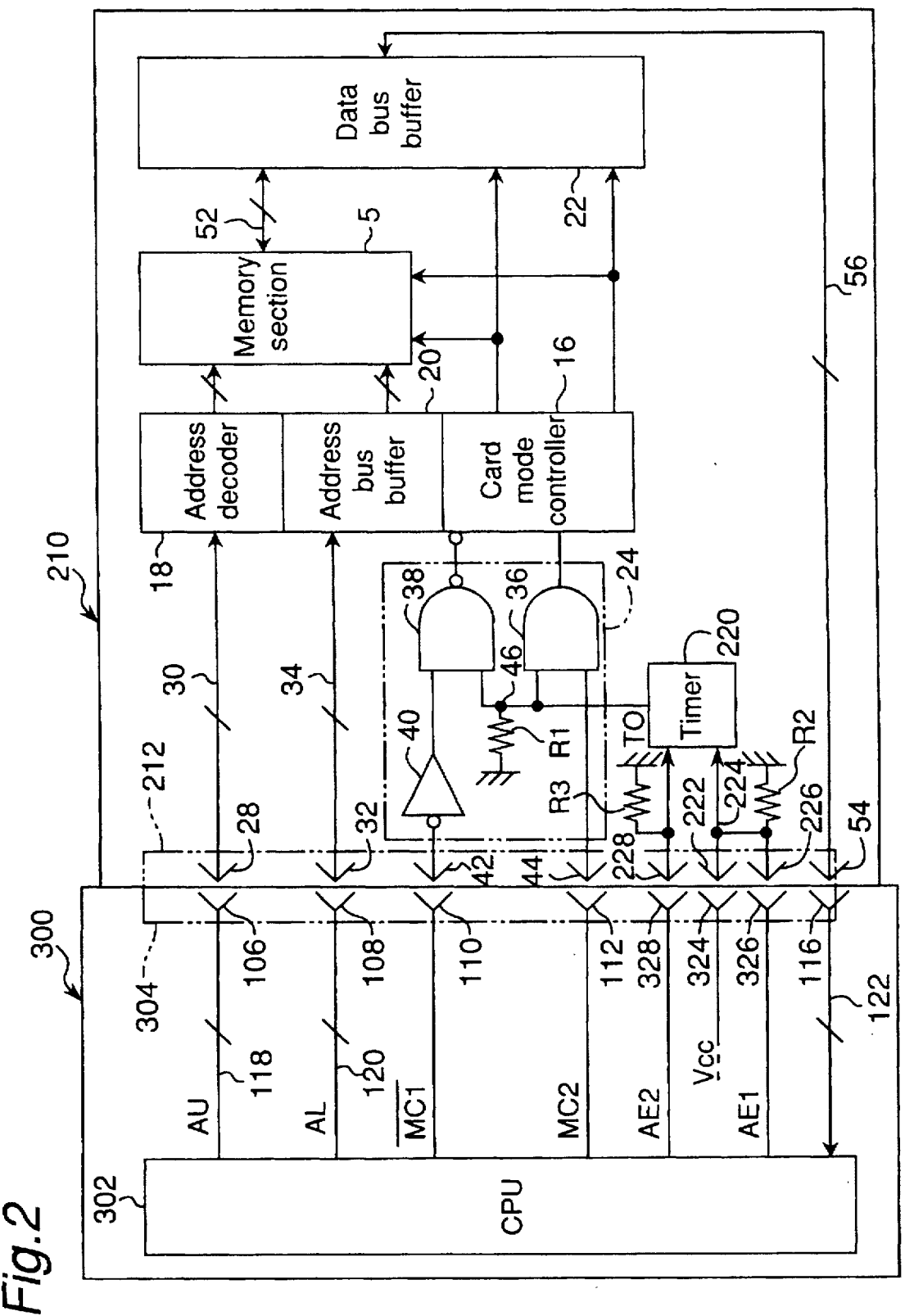
FIG. 2 is a block diagram of a data processor system of a second embodiment according to the present invention.

FIG. 2 shows a data processing system of another embodiment of the present invention, wherein an IC card 210 is connected to a personal computer 300. The personal computer 300 has a connector 304 having a general interface standard, and a connecting section 212 of the IC card 210 is detachably connected to the connector 304. The data processing system shown in FIG. 2 is different from that shown in FIG. 1 in that a timer 220 and relevant components are provided to control the gate circuit 24 instead of the detector circuit 26. The timer 220 has a pull-down resistor $R_2$ connected between the power supply line 224 and the ground. Another pull-down resistor $R_3$ is also connected between a terminal 228 and the ground. Components of FIG. 2 corresponding to those of FIG. 1 are designated by like numerals, and description thereof is omitted for clarity.

In the system shown in FIG. 2, a power supply voltage $V_{cc}$ is supplied to the timer 220 from the personal computer 300 through a terminal 324 of the connector 304, a terminal 222 of the connecting section 212 of the IC card 210 connected to the terminal 324, and a line 224, to an input of the timer 220. Thus, when the IC card 210 is connected to the personal computer 300, the timer 220 is started because the power supply voltage $V_{cc}$ is supplied as a timer enable signal. Further, the power supply voltage $V_{cc}$ received by the timer 220 is also supplied through a connecting terminal 226 and a connector terminal 326 connected thereto to the CPU 302 of the personal computer 300 as an IC card identification signal AE1. The signal AE1 shows that the IC card 210 has the security function compatible with that of the personal computer 302. In correspondence to the identification signal AE1, the personal computer 302 sends another identification signal AE2 to the other input of the timer 220 after a prescribed time passes through a terminal 328 of the connector 304, a terminal 228 of the connecting section 212. The signal AE2 shows that the personal computer 300 is a specific personal computer that is allowed to access the IC card 210. Then, an output signal of the timer 220 is supplied to the connection point 46, to control the AND gate 36 and the NAND gate 38 in the gate circuit 24.

The terminals 324 and 222 used for transmitting the identification signal AE are terminals not defined in the general interface standard, as well as the terminals 326, 226, 328 and 228 for transmitting the access enable signals AE1 and AE2. Therefore, if the personal computer 300 does not have the security function according to this embodiment, it cannot send the identification signals to the IC card 210, or it cannot access the IC card 210.

The sequence for the timer 220 is explained here. After a prescribed time elapses since the input of the IC card identification signal AE1 from the IC card 210, the CPU 102 of the personal computer 300 outputs a system identification signal AE2 to the terminal 328 of the connector 304. The system identification signal AE2 is fed to the timer 220 through the terminal 328 of the connector 304 and a terminal 228 of the connecting section 212 connected thereto. If the system identification signal AE2 is inputted within a predetermined time period Tm since the timer 220 starts, the timer 220 holds its output TO at "H" level, even after the timer expires, and the mode control signals $\overline{MC1}$ and MC2 are supplied to the card mode control section 16 through the AND gate 36 and the NAND gate 38. That is, the timer 220 functions as a sequence detection circuit that detects whether or not the input of the power supply voltage as a timer enable signal and the input of the system identification signal AE2 follow a specified sequence.

Figure 3:
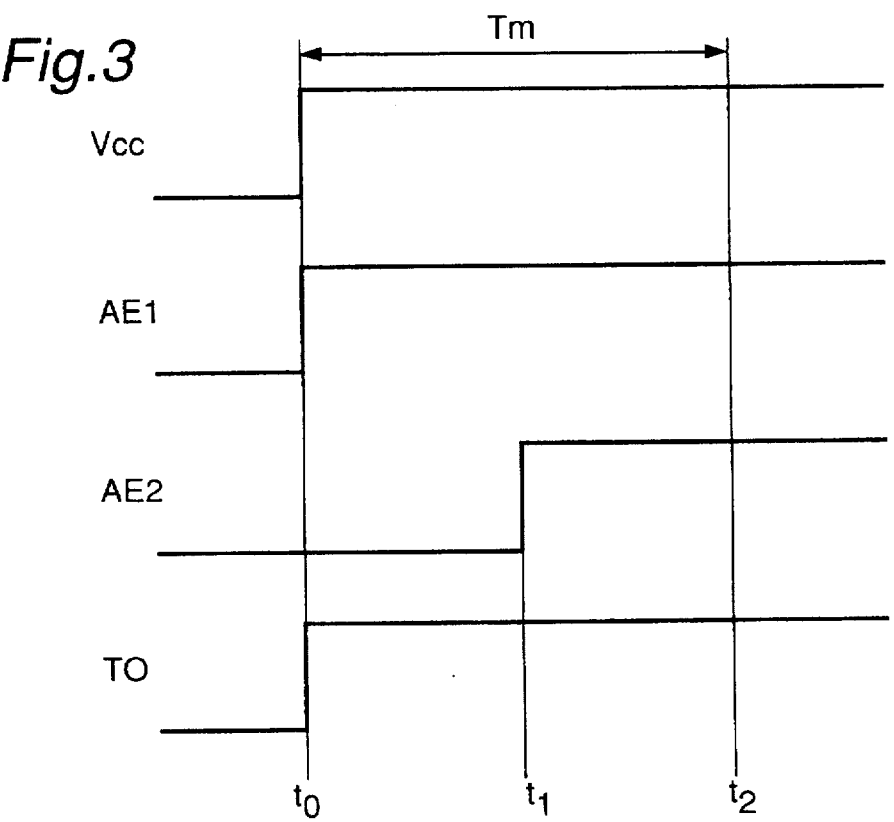
FIG. 3 is a timing chart of the data processor system shown in FIG. 2, where data can be read from an IC card.

As shown in FIG. 3, when a user, who has the personal computer 300 having the security function, connects the IC card 210 to the personal computer 300, the timer 220 of the IC card 210 is started at a time $t_0$ with a power supply voltage $V_{cc}$ supplied from the personal computer 300, while the power supply voltage $V_{cc}$ supplied to the timer 220 is also supplied to the CPU 302 of the personal computer 300 as the IC card identification signal AE1. When the identification signal AE1 is received, the CPU 302 outputs the system identification signal AE2 at a time $t_1$ within a predetermined time period Tm after the timer 220 is started or until the timer 220 expires. As a result, the timer 220 holds its output TO at "H" level, even after the expiration at time $t_2$. Then, the NAND gate 38 and the AND gate 36 pass the mode control signals $\overline{MC1}$ and MC2 received from the CPU 302 of the personal computer 300, to the card mode control section 16 of the IC card 210, so that it enables the personal computer 300 to access the IC card 210.

Figure 4:
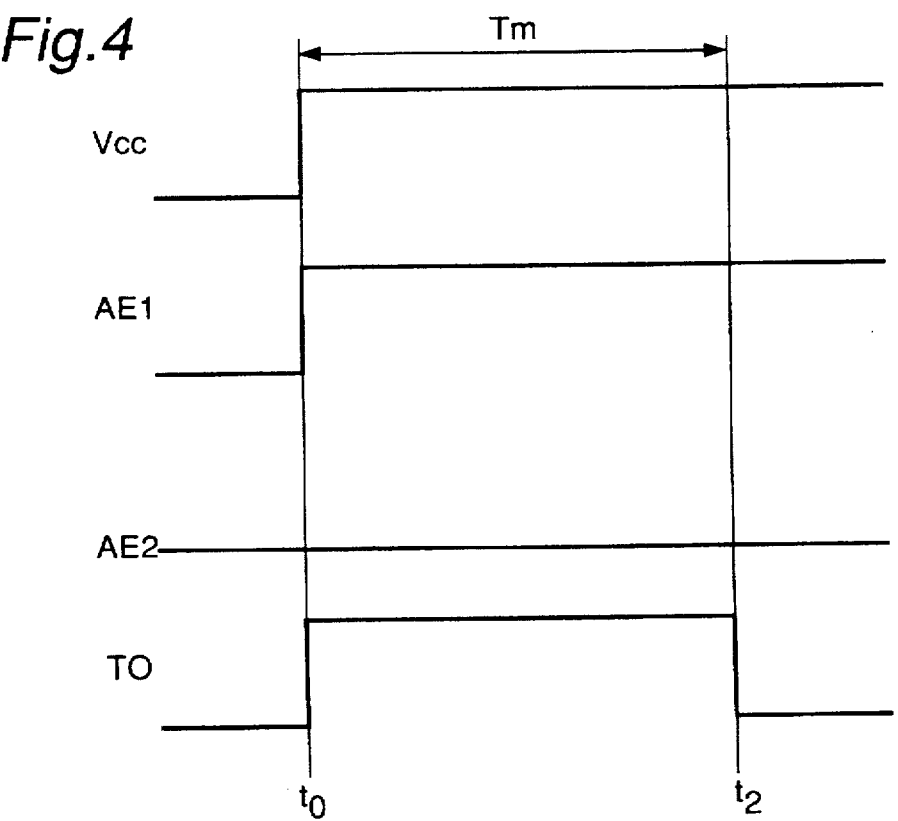
FIG. 4 is a timing chart of the data processor of FIG. 2, where data cannot be read from the IC card.

On the other hand, if a user, who has possession of the IC card 210, connects the IC card 210 to a general personal computer in order to access the IC card 210, the timer 220 in the IC card 210 is not started because the personal computer can not supply the identification signal AE2. In this case, as shown in FIG. 4, the output TO of the timer 220 is normally held at "L" level after the timer 220 expires. Accordingly, the NAND gate 38 and the AND gate 36 of the gate circuit 24 are kept closed or the mode control signals $\overline{MC1}$ and MC2 are not supplied to the card mode controller 16, so that it is disabled to access data in the IC card 210 by the general personal computer.

Also, when a user who has possession of the IC card 210 connects the IC card 210 to a general personal computer, even if the personal computer happens to be so arranged that some power supply voltage is supplied to the IC card 210 by using a terminal not defined in the general interface standard for the personal computer, there is no circuit that transmits the supplied power supply voltage to the CPU of the personal computer as the IC card identification signal AE1. Accordingly, the system identification signal AE2 will not be received from the CPU of the personal computer.

In the above case, even if the IC card identification signal AE1 is inputted to the general personal computer and the system identification signal AE2 is outputted from the CPU of the personal computer, the timer 220 will expire at the time $t_2$ after a time elapse of the time period Tm of the timer 220, to change the output of the timer 220 from "H" to "L" level, so that the NAND gate 38 and the AND gate 36 are kept closed. As a result, the mode control signals $\overline{MC1}$ and MC2 will not be supplied to the card mode control section 16 of the IC card 210, so that it is disabled for the personal computer to access the IC card 210.

It is an advantage of the data processing system shown in FIG. 2 that it becomes more difficult to access the IC card 210. Then, even higher security is maintained for the IC card, as compared with the data processor shown in FIG. 1.

In the IC card 210 shown in FIG. 2, the gate circuit 24 comprising the gates 36, 38 and 40 and the timer 24 is used. However, a person skilled in the are may find various modifications. For example, the gate circuit may be constructed with parts including, for example, flip flops. Further, though the timer 220 is used as a sequence detection circuit for the two inputs, a flip flop may also be used to change its output according to two inputs, or the timer enable signal ($V_{cc}$) and the access enable signal AE2. If a flip flop is used instead of the timer, the time period Tm is not counted, but the input of the signal AE2 after the input of the signal $V_{cc}$ can be confirmed.

Figure 5:
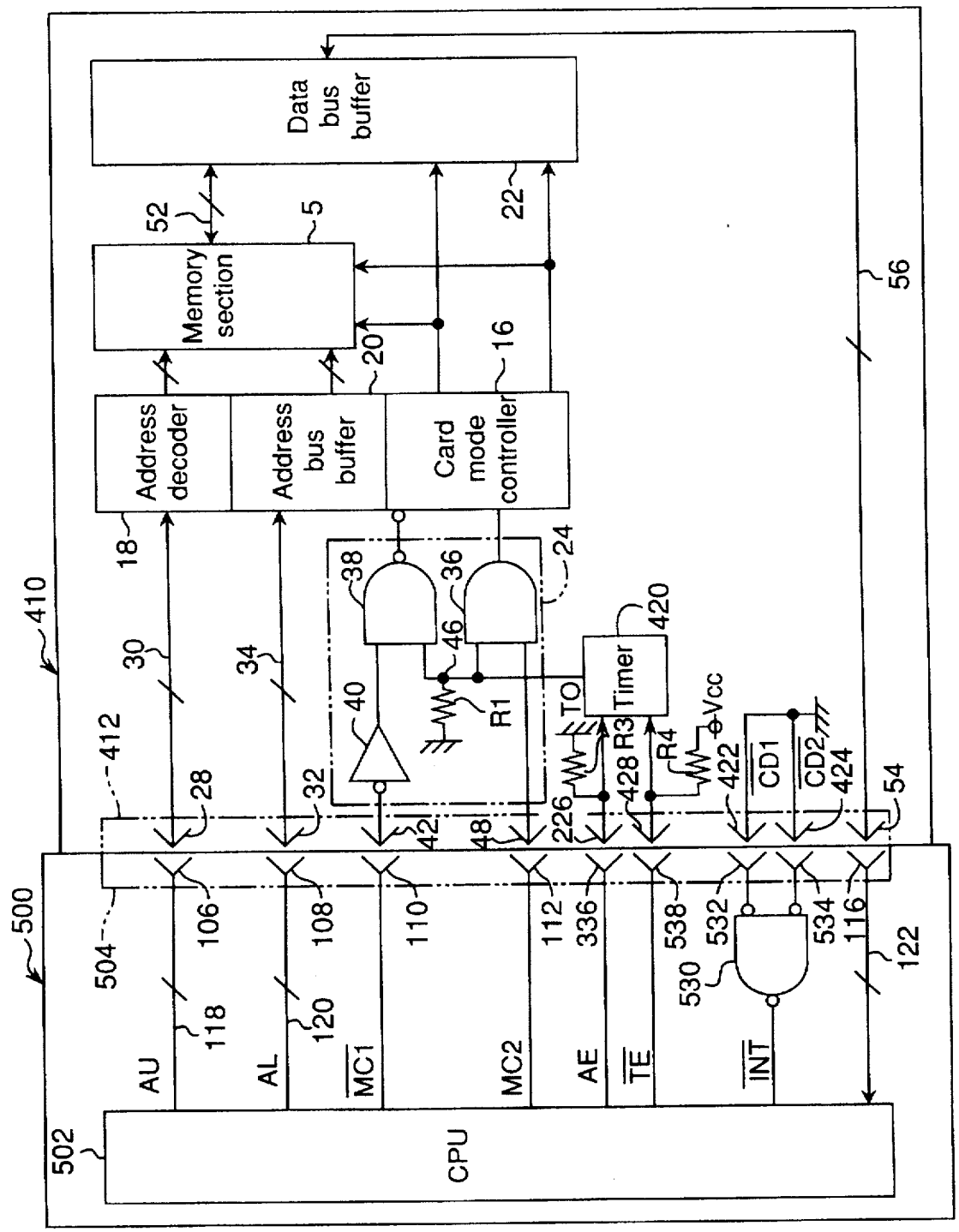
FIG. 5 is a block diagram of a data processor system of a third embodiment according to the present invention.

FIG. 5 shows a data processing system of a third embodiment of the present invention, wherein an IC card 410 is connected to a personal computer 500. The personal computer 500 has a connector 504 having a prescribed general interface standard, and a connecting section 412 of the IC card 410 is detachably connected to the connector 504. The data processing system shown in FIG. 5 is different from that shown in FIG. 2 in that a timer 420, an OR gate 530 and relevant components therefor are provided to control the gate circuit 24. Components shown in FIG. 5 corresponding to those shown in FIG. 2 are designated by like numerals, and description thereof is omitted for clarity.

In the data processing system, an interrupt signal is supplied by the IC card 410 to the CPU 502 in the data processor 502 in order to start a sequence. Terminals 422 and 424 in the connecting section 412 are connected to the ground. Then, IC card identification signals $\overline{CD1}$ and $\overline{CD2}$ of L level are supplied from the IC card 410 to two inputs of the OR gate 530 through the terminals 422 and 424 and counterpart terminals 532 and 534 of the connector 504. Terminals 532, 534 to be connected to the terminals 422, 424 are connected to the input of the OR gate 530 provided in the personal computer 500. Then, the OR gate 530 outputs an interrupt $\overline{INT}$ to the CPU 102 of the personal computer 500. Then, the CPU 102 starts a sequence processing. That is, it generates a timer enable command $\overline{TE}$ to send it through a terminal 538 of the connector 504 and a terminal 428 of the connecting section 412 to the timer 420 in the IC card 410, while it also generates a system identification signal AE to be sent to the timer 420 after a predetermined time elapses since the generation of the timer enable command $\overline{TE}$. A pull-up resistor $R_4$ is connected between the connecting terminal 428 of the connecting section 412 of the IC card 410 and the power supply voltage $V_{cc}$ of the IC card 410.

The terminals 422, 424, 532, 534 used for transmitting the signals $\overline{CD1}$ and $\overline{CD2}$ are terminals not defined in the general interface standard, as well as the terminals 226, 428, 336 and 538 for transmitting the timer access signal $\overline{TE}$ and the access enable signal AE. Therefore, if the personal computer 500 does not have the security function compatible with that of the IC card 410 according to this embodiment, it cannot send the signals $\overline{TE}$ and AE to the IC card 210, or it cannot access the IC card 410.

The sequence is explained here. The CPU 502 of the personal computer 500 is interrupted by receiving the IC card identification signals $\overline{CD1}$ and $\overline{CD2}$, and outputs the system identification signal AE to the connector terminal 336 of the connector 504 after a specified time elapse since the output of the timer enable command $\overline{TE}$. The timer 420 holds its output TO at "H" level even after the timer 420 expires if the system identification signal AE has been received within the prescribed time period Tm since the interrupt signal is received. As a result, the mode control signals $\overline{MC1}$ and $\overline{MC2}$ are passed by the NAND gate 38 and the AND gate 36 in the gate circuit 24 to the card mode control section 16. That is, the timer 420 functions as a sequence detection circuit that detects a sequence which is started by the CPU after receiving the interrupt signal $\overline{INT}$ and is completed when the system identification signal AE.

In this example, the sequence is started when the CPU receives the interrupt signal $\overline{INT}$ from the IC card 410. However, in an alternate way, the sequence may be started by using an identification signal supplied by the IC card 410 after receiving the power supply voltage $V_{cc}$ from the personal computer 500, similarly to the data processing system shown in FIG. 2.

Figure 6:
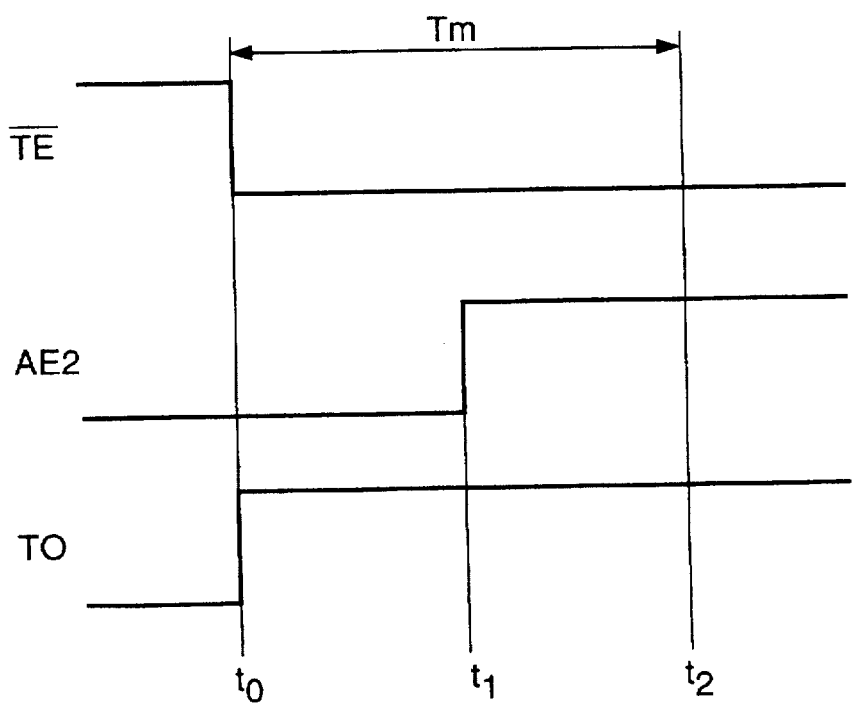
FIG. 6 is a timing chart of the data processor system shown in FIG. 5, where data is read from the IC card.

When a user has connected the connecting section 412 of the IC card 410 to the connector 504 of the personal computer 500, the IC card 410 outputs the IC card identification signals $\overline{CD1}$ and $\overline{CD2}$ to the OR gate 530 for interrupting the personal computer 500. As shown in FIG. 6, when the CPU 102 in the personal computer 500 is interrupted, the timer enable command $\overline{TE}$ is fed by the CPU 102 to the timer 420 of the IC card 410 at the time $t_0$ to start the timer 420 at a time $t_0$. The CPU 502 outputs the system identification signal AE to the timer 420 at a time $t_1$ within a time period Tm after the time $t_0$ until when it expires. As a result, the timer 420 holds its output TO at "H" level, even after the timer 420 expires at a time $t_2$. The NAND gate 38 and the AND gate 36 pass the mode control signals $\overline{MC1}$ and $\overline{MC2}$ received from the CPU 502, to the card mode control section 16, so that it is enabled to access the IC card 410 by the personal computer 500.

On the other hand, if a general user who has got the IC card 410 has connected the IC card 410 to a general personal computer in order to read data in the IC card 410, because the general personal computer does not have the OR gate 530, the CPU thereof will not be interrupted. Therefore, neither the timer enable command $\overline{TE}$ for the timer 420 of the IC card 410 nor the system identification signal AE will not be supplied by the general personal computer to the IC card 410, so that the timer 420 will not be started. In this case, the output TO of the timer 420 is normally held at "L" level, and the NAND gate 38 and the AND gate 36 of the gate circuit 24 of the IC card 410 have their other input terminals grounded by the pull-down resistor $R_1$ at "L" level. Accordingly, the NAND gate 38 and the AND gate 36 are closed, so that the mode control signals $\overline{MC1}$ and $\overline{MC2}$ are not supplied. Thus, it is disabled for the personal computer to read data from the IC card 410.

As explained above, in the data processing system shown in FIG. 5, the start of the timer 420 in the IC card 410 is controlled by the personal computer 500. Therefore, it becomes more difficult to access the IC card 410, and high security is maintained for the IC card 410.

Figure 7:
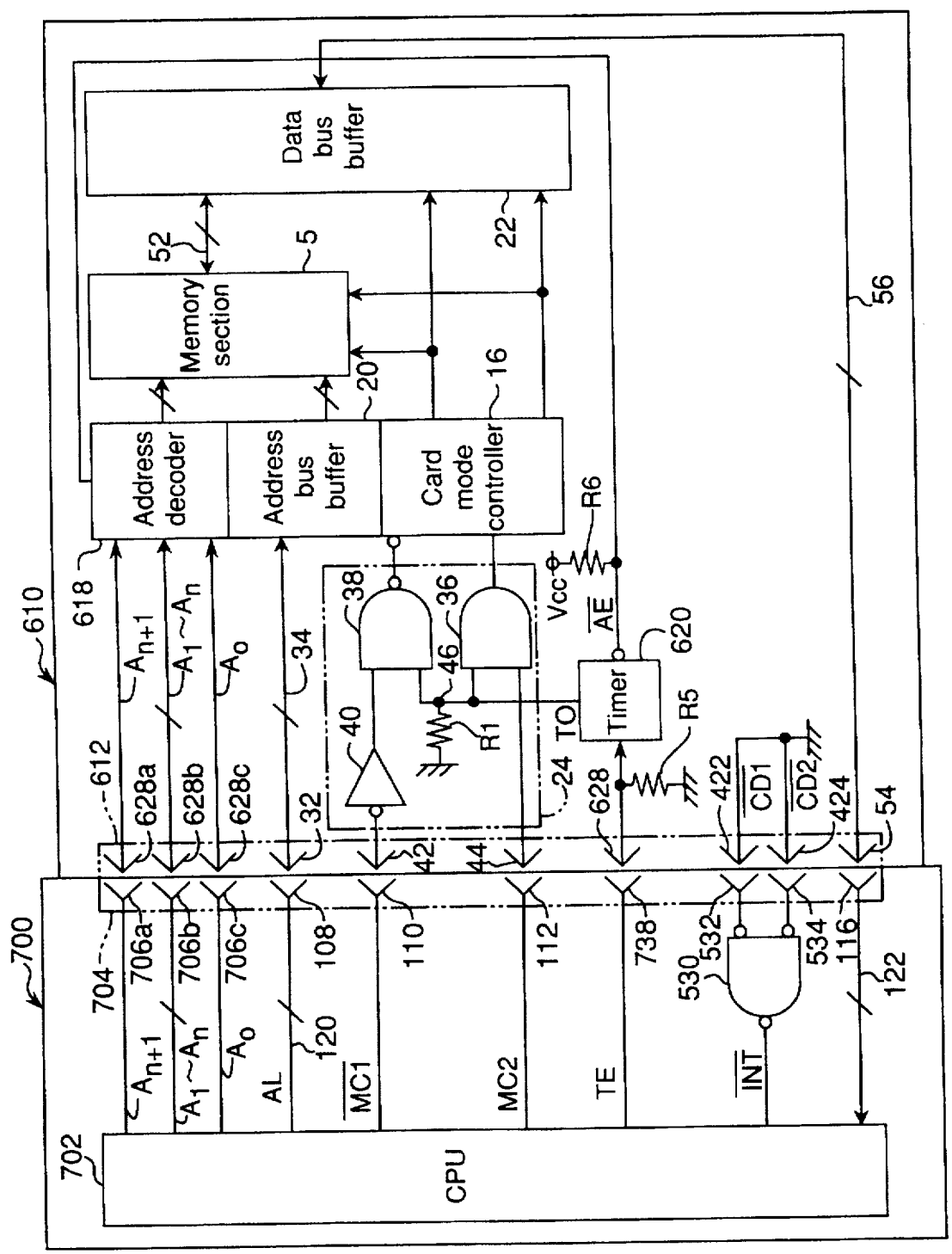
FIG. 7 is a block diagram of a data processor system of a fourth embodiment according to the present invention.

FIG. 7 shows a data processing system of a fourth embodiment of the present invention, wherein an IC card 610 is connected to a personal computer 700. The personal computer 700 has a connector 704 having a general interface standard, and a connecting section 612 of the IC card 610 is detachably connected to the connector 704. The data processing system shown in FIG. 7 is different from that shown in FIG. 5 in that a timer 620, an address decoder 618 and relevant components thereof are provided to control the gate circuit 24. Components shown in FIG. 7 corresponding to those shown in FIG. 5 are designated by like numerals, and description thereof is omitted for clarity.

In the data processing system as described in FIG. 7, an address bus is illustrated as three bus lines 118 for bit $A_{n+1}$, $A_1$–$A_n$ and $A_0$, and the connecting terminals are also shown as three parts 706a, 706b, 706c and 628a, 628b and 628c, respectively. Then, after a prescribed time elapses since a timer enable command TE is supplied by the CPU 702 in the personal computer 700 to the timer 620 through a terminal 738 of the connector 704 and a terminal 628 of the connecting section 612 of the IC card 610, the CPU 702 outputs a specified address signal to the address decoder 618 through the most significant bit line $A_{n+1}$ and the least significant bit line $A_0$. Then, the address decoder 618 generates an identification signal $\overline{AE}$ to be supplied to the timer 620.

An input terminal for a timer enable command TE of the timer 620 is connected to the ground by a pull-down resistor $R_5$, while the input terminal 628 for the system identification signal $\overline{AE}$ is connected to the power supply voltage $V_{cc}$ by a pull-up resistor $R_6$. The bit line $A_{n+1}$ in the personal computer 700, and the bit line $A_{n+1}$ in the IC card 610 are connected to each other by a terminal 706a in the connector 704 of the personal computer 700 and a terminal 628a of the connecting section 12 in the IC card 610, while the bit line $A_0$ in the personal computer 700, and the bit line $A_0$ in the IC card 610 are connected to the connector terminal 706c in the connector 704 and to the terminal 628c in the connector 704. The bit lines $A_1$ to $A_n$ are connected to n terminals denoted by reference numerals 706b, 628b, respectively.

The terminals 628a, 628c, 706a, 706c used for transmitting the particular address signal are terminals not defined in the general interface standard, as well as the terminals 422, 424, 532, 534, 628 and 738 for transmitting the signals $\overline{CD1}$ and $\overline{CD2}$ and the timer access signal $\overline{TE}$. Therefore, if the personal computer 500 does not have the security function according to this embodiment, it cannot send the particular address signal and the timer enable command TE to the IC card 610, or it cannot access the IC card 610.

In the data processing system described above, when a user has connected the IC card 610 to the personal computer 700, the IC card 610 outputs the IC card identification signals $\overline{CD1}$ and $\overline{CD2}$ to the OR gate 530 of the personal computer 700 for interrupting the CPU 702 in the personal computer 700. When the CPU 702 is interrupted by an interrupt signal $\overline{INT}$ due to the IC card identification signals $\overline{CD1}$ and $\overline{CD2}$, the timer enable command $\overline{TE}$ is generated by the CPU 702 to be supplied to the timer 620 of the IC card 610 so that the timer 620 is started. When the CPU 702 of the personal computer 700 has designated a particular address through the bit lines $A_0$ and $A_{n+1}$ within a time period after the timer 620 is started until when it expires, the address decoder 618 outputs the system identification signal $\overline{AE}$ to the timer 620. Then, the timer 620 holds its output TO at "H" level, even after it expires. The NAND gate 38 and the AND gate 36 passes the mode control signals $\overline{MC1}$ and $\overline{MC2}$ received from the personal computer 700, to the card mode control section 16 in the IC card 610, so that it enables to access data in the IC card 610 by the personal computer 700.

It is to be noted that the above-mentioned sequence is started when the CPU 702 receives the signals $\overline{CD1}$, $\overline{CD2}$ from the IC card 610. However, in an alternate way, in order to start the sequence, instead of using the signals $\overline{CD1}$, $\overline{CD2}$, it may be possible to use an identification signal supplied by the IC card 610 after receiving the power supply voltage $V_{cc}$ from the personal computer 700, similarly to the personal computer shown in FIG. 2.

On the other hand, if a general user, who has got the IC card 610 having the security function, has connected the IC card 610 to the general personal computer in order to access data in the IC card 610, the system identification signal $\overline{AE}$ will not be supplied to the timer 620 by the address decoder 18 unless the CPU of the personal computer outputs the particular address through the bit lines $A_0$ and $A_{n+1}$ within a specified time period since the timer 620 is started, even if the timer 620 is started by an input of, for example, a noise. Accordingly, the NAND gate 38 and the AND gate 36 of the gate circuit 24 are closed, so that the mode control signals $\overline{MC1}$ and $\overline{MC2}$ will not be passed to the card mode control section 16 in the IC card 610. Thus, it is disabled to read data from the IC card 610 with the personal computer.

Accordingly, in the data processing system shown in FIG. 7, the system identification signal $\overline{AE}$ will not be generated to be sent to the timer 620 by the address decoder 618 unless a particular address signal is outputted from the personal computer 700. Therefore, it becomes difficult for the personal computer to access the IC card 610, and high security is maintained for the data in the IC card 610.

Figure 8:
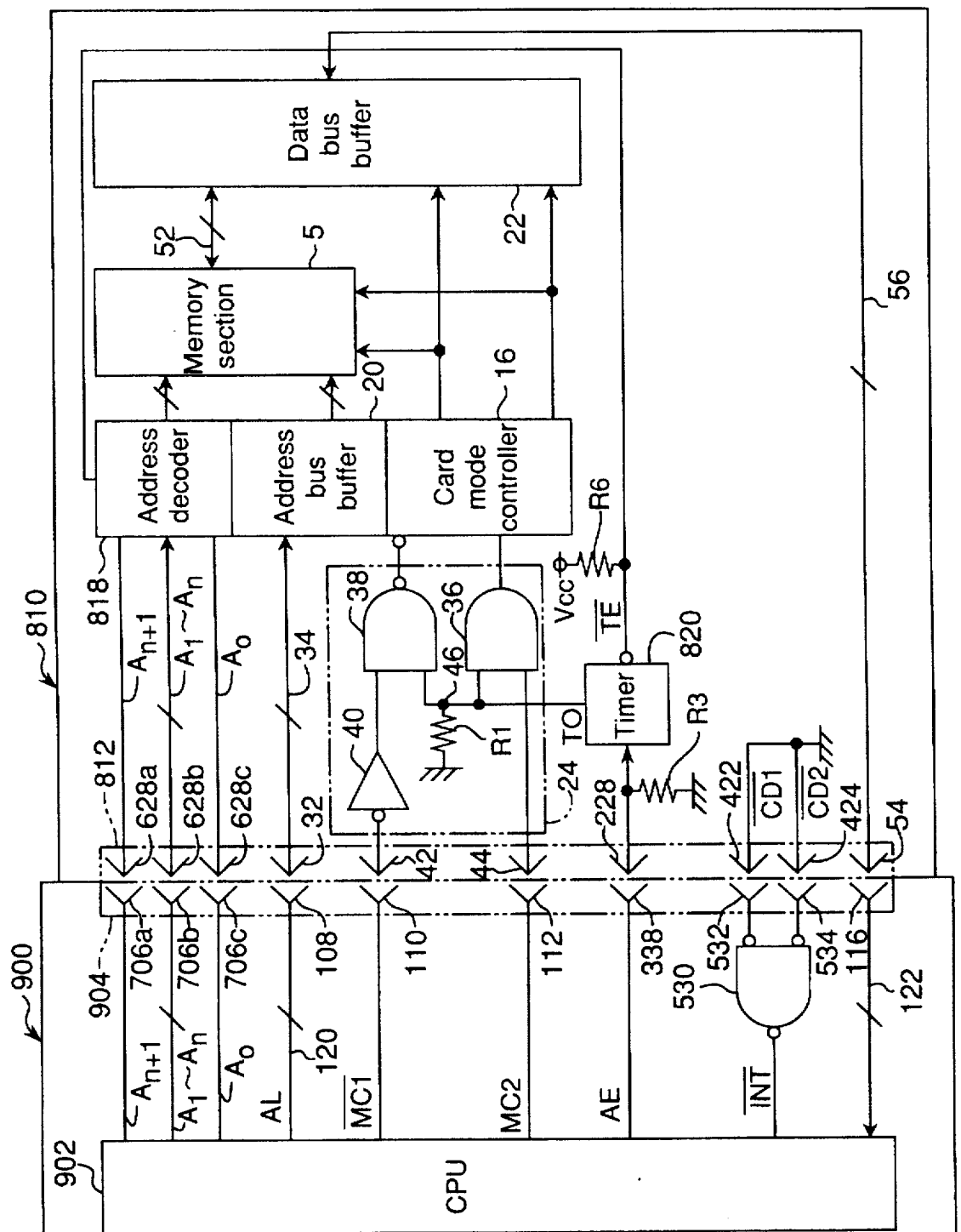
FIG. 8 is a block diagram of a data processor system of a fifth embodiment according to the present invention.

FIG. 8 shows a data processing system of a fifth embodiment of the invention, wherein an IC card 810 is connected to a personal computer 900. The personal computer 900 has a connector 904 having a general interface standard, and a connecting section 812 of the IC card 810 is detachably connected to the connector 904. The data processing system shown in FIG. 8 is different from that shown in FIG. 7 in that a timer 820 and relevant components thereof are provided to control the gate circuit 24. Components shown in FIG. 8 corresponding to those shown in FIG. 7 are designated by like numerals, and description thereof is omitted for clarity.

In the data processing system, the timer 820 in the IC card 810 is started at a time point when the CPU 902 of the personal computer 900 outputs a particular address signal through the bit lines $A_{n+1}$ and $A_0$. More specifically, when the CPU 902 outputs the particular address signal to the address decoder 818 in the IC card 810 through the bit lines $A_{n+1}$ and $A_0$, the address decoder 818 generates a timer enable command $\overline{TE}$ to be sent to the timer 820. After a prescribed time elapses since the particular address signal is output, the CPU 902 generates a system identification signal AE to be sent through terminals 338 and 228 to the timer 820.

In the data processing system described above, when a user has connected the IC card 810 to the personal computer 900, the IC card 810 supplies the IC card identification signals $\overline{CD1}$ and $\overline{CD2}$ to the OR gate 530 which generates an interrupt signal $\overline{INT}$ to interrupt the personal computer 800. Then, the CPU 902 generates a particular address through the bit lines $A_0$ and $A_{n+1}$. As a result, the timer enable command $\overline{TE}$ is generated by the address decoder 818 in the IC card 810 to be sent to the timer 820 so that the timer 820 is started. Then, the CPU 902 feeds the system identification signal AE2 to the timer 820 within a time period after the timer 820 is started. As a result, the timer 820 holds its output TO at "H" level, even after it expires. The NAND gate 38 and the AND gate 36 pass the mode control signals $\overline{MC1}$ and $\overline{MC2}$ received from the CPU 902, to the card mode control section 16 in the IC card 810, so that it is enabled for the personal computer 900 to access the IC card 810.

It is to be noted that the above-mentioned sequence is started when the CPU 902 receives the signals $\overline{CD1}$, $\overline{CD2}$ from the IC card 810. However, in an alternate way, in order to start the sequence, instead of using the signals $\overline{CD1}$, $\overline{CD2}$, it may be possible to use an identification signal supplied by the IC card 810 after receiving the power supply voltage $V_{cc}$ from the personal computer 900, similarly to the personal computer shown in FIG. 2.

On the other hand, if a general user who has got the IC card 810 having the security function has connected the IC card 810 to a general personal computer in order to read data in the IC card 810, the CPU of the personal computer will not generate the particular address to the address decoder 818 in the IC card 810 through the bit lines $A_0$ and $A_{n+1}$. In this case, the timer enable command $\overline{TE}$ will not be generated by the address decoder 818 to be sent to the timer 820, so that the timer 820 will not be started. Also, even if the timer 820 is started by a noise or the like, the output TO of the timer 820 is held at "L" level unless the CPU supplies the system identification signal AE within a specified time period set by the timer 820. Accordingly, the NAND gate 38 and the AND gate 36 of the gate circuit 24 are closed, so that the mode control signals $\overline{MC1}$ and $\overline{MC2}$ will not be passed from the personal computer to the card mode control section 16 in the IC card 810. Thus, it disables for the personal computer to read data from the IC card 810.

As explained above, in the data processing system, the timer 820 will not be started unless the CPU 902 of the personal computer 900 outputs to the address decoder 18 a particular address signal. Therefore, in the data processing system, in which the timer is started after a particular address signal is received from the personal computer 900, it becomes difficult for the personal computer to access the IC card 810, and high security is maintained for the IC card 810.

Figure 9:
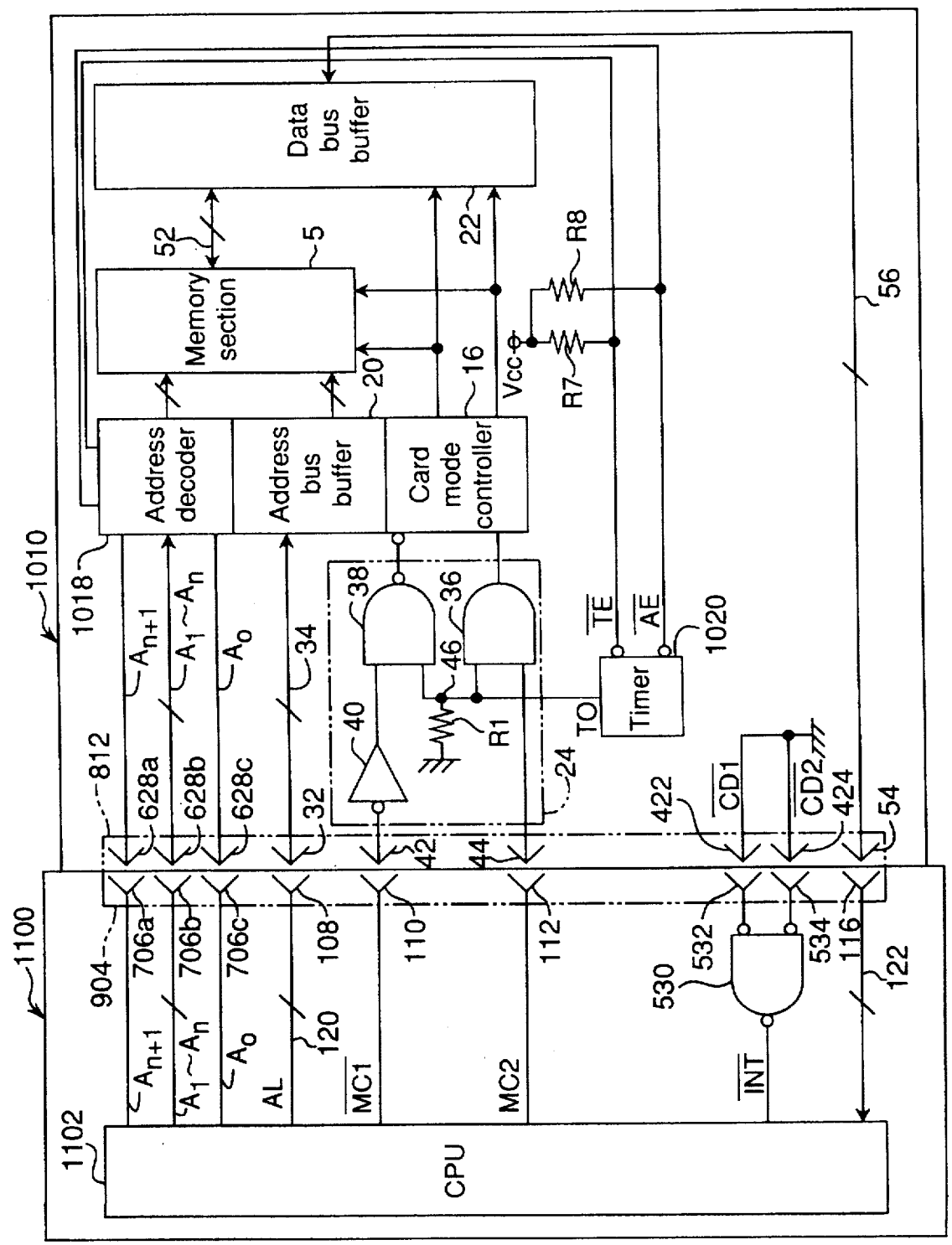
FIG. 9 is a block diagram of a data processor system of a sixth embodiment according to the present invention.

FIG. 9 shows a sixth embodiment of the present invention which is regarded as a combination of the data processing systems shown in FIGS. 7 and 8, wherein an IC card 1010 is connected to a personal computer 1100. The personal computer 1100 has a connector 1104 having a prescribed interface standard, and a connecting section 812 of the IC card 1010 is detachably connected to the connector 904. The data processing system shown in FIG. 9 is different from those shown in FIGS. 7 and 8 in that a timer 1020, an address decoder 1018 and relevant components thereof are provided to control the gate circuit 24. More specifically, in the data processing system, when the CPU 1102 of the personal computer 1100 outputs a particular address signal through the bit lines $A_{n+1}$ and $A_0$, the timer enable command $\overline{TE}$ is generated by the address decoder 1018 to the timer 1020 in the IC card 1010. Further, when the CPU 1102 of the personal computer 1100 outputs a particular address signal through the bit lines $A_{n+1}$ and $A_0$ within a predetermined time period after the generation of the timer enable command $\overline{TE}$, the system identification signal $\overline{AE}$ is generated by the address decoder 1018 and fed to the timer 1020. The input terminals for the timer enable command $\overline{TE}$ and for the system identification signal $\overline{AE}$ of the timer 1020 are pulled up to the power supply voltage $V_{cc}$ by resistors $R_7$ and $R_8$, respectively. Components shown in FIG. 9 corresponding to those shown in FIGS. 7 and 8 are designated by like numerals, and description thereof is omitted for clarity.

In the data processing system, when a user has connected the IC card 1010 having the security function to the connector 904 of the personal computer 1100, the IC card 1010 outputs the IC card identification signals $\overline{CD1}$ and $\overline{CD2}$ to the OR gate 530 of the personal computer 1100 to interrupt the CPU 1102 of the personal computer 1100. Then, the CPU 1102 generates a particular address through the bit lines $A_0$ and $A_{n+1}$. As a result, the timer enable command $\overline{TE}$ is generated by the address decoder 1018 of the IC card 1010 to be sent to the timer 1020 so that the timer 1020 is started. The CPU 1102 of the personal computer 1100 once again designates another particular address through the bit lines $A_0$ and $A_{n+1}$ within a time period after the timer 1020 is started until it expires. As a result, the system identification signal $\overline{AE}$ is supplied by the address decoder 1018 to the timer 1020, so that the timer 1020 holds its output TO at "H" level, even after the timer 1020 expires. Therefore, the NAND gate 38 and the AND gate 36 pass the mode control signals $\overline{MC1}$ and $\overline{MC2}$ received from the personal computer 1100, to the card mode control section 16 of the IC card 1010. Thus, it enables for the personal computer 1100 to read data from the IC card 1010.

It is to be noted that the above-mentioned sequence is started when the CPU 1102 receives the signals $\overline{CD1}$, $\overline{CD2}$ from the IC card 1010. However, in an alternate way, in order to start the sequence, instead of using the signals $\overline{CD1}$, $\overline{CD2}$, it may be possible to use an identification signal supplied by the IC card 1010 after receiving the power supply voltage $V_{cc}$ from the personal computer 1100, similarly to the personal computer shown in FIG. 2.

On the other hand, if a general user, who has got the IC card 1010, has connected the IC card 1010 to the general personal computer in order to read data in the IC card 1010, the CPU of the personal computer will not generate particular addresses to the address decoder 1018 in the IC card 1010 through the bit lines $A_0$ and $A_{n+1}$ in a prescribed sequence. In this case, the timer enable command $\overline{TE}$ will not be supplied by the address decoder 1018 to the timer 1020, so that the timer 1020 will not be started. Also, even if the timer 1020 is started by a noise or the like, the output TO of the timer 1020 is held at "L" level unless the particular address is supplied by the CPU of the personal computer to the address decoder 1018 in the IC card 1010 through the bit lines $A_0$ and $A_{n+1}$ within a specified time period set by the timer 1020. Accordingly, the NAND gate 38 and the AND gate 36 in the gate circuit 24 are closed, so that the mode control signals $\overline{MC1}$ and $\overline{MC2}$ will not be passed from the CPU of the personal computer to the card mode control section 16 in the IC card 1010. Thus, it disables for the personal computer to read data from the IC card 1010.

As explained above, in the data processing system, neither the timer enable command $\overline{TE}$ nor the system identification signal $\overline{AE}$ will be supplied by the address decoder 1018 to the timer 1020, unless the CPU 1102 of the personal computer 1100 outputs to the address decoder 1018 the particular address signal through the bit lines $A_{n+1}$ and $A_0$. Therefore, the data processing system has advantages on security of the two data processing systems shown in FIGS. 7 and 8 in combination, so that much higher security is maintained for the IC card 1010.

As will be understood easily, if a more complicated sequence is desired, a sequence circuit and a sequence detection circuit different from the timer 220 or the like used in the above-mentioned embodiments may be adopted, though not explained in detail here.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data storage device comprising:
   a data storage section storing data;
   a connector detachable connected to an external data processor, the connector including terminals for transmitting an address signal, a data signal and control signals, the control signals including prescribed control signals for controlling said data storage section and an access enable signal for discriminating that the external data processor is permitted to access the data storage device;
   a transmission controller generating a signal when the access enable signal is received from said connector; and
   a storage controller supplying the prescribed control signals received from said connector said data storage section when the signal is received from said transmission controller.

2. The data storage device according to claim 1, wherein said connector includes a specified terminal to receive the access enable signal, the terminal being not defined in an interface standard applied to said connecter, and said transmission controller includes a transmission line connected between the specified terminal and said storage controller.

3. The data storage device according to claim 1, wherein said data storage device is an IC card and the external data processor to be connected to said data storage device is a computer.

4. A data storage device comprising:

a data storage section storing data;

a connector detachably connected to an external data processor, said connector including terminals for transmitting an address signal, a data signal and control signals, the control signals including prescribed control signals for controlling said data storage section and an access enable signal for discriminating that the external data processor is permitted to access the data storage device;

a gate passing the prescribed control signals received from said connector to said data storage section; and a gate controller activating said gate to pass the prescribed control signals to said data storage section when the access enable signal is received through said connector from the external data processor.

5. The data storage device according to claim 4, wherein said data storage device is an IC card and the external data processor to be connected to said data storage device is a personal computer.

6. The data storage device according to claim 5, wherein the access enable signal is received through a specified terminal of said connector wherein the specified terminal is a terminal not defined in an interface standard applied to said connector.

7. A data storage device comprising:

a data storage section storing data;

a connector detachably connected to an external data processor, said connector including terminals for transmitting an address signal, a data signal and control signals, the control signals including prescribed control signals for controlling said data storage section;

a gate passing the prescribed control signals received from said connector to said data storage section; and a gate controller for detecting if first and second signals generated based on signals received through said connector form the external data processor are received in a prescribed sequence and for activating said gate to pass the prescribed control signals to said data storage section when the first and second signals are detected to be received in the prescribed sequence.

8. The data storage device according to claim 7, wherein said gate controller comprises a timer device which is started after the first signal is received, and sends a signal to activate said gate to pass the prescribed control signals when the second signal is received at a prescribed timing after the first signal is received.

9. The data storage device according to claim 8, wherein said connector further comprises a terminal for receiving an power supply voltage from the external data processor, and said timer device receives the power supply voltage from said connector as the first signal.

10. The data storage device according to claim 8, further comprising a signal generator which generates an interrupt signal to be sent to the external data processor, said connector further comprises a terminal to receive the interrupt signal and a terminal to receive a start instruction signal to be sent to said timer device, wherein said timer receives the start instruction signal as the first signal, whereby the start instruction signal is generated by the external data processor after receiving the interrupt signal.

11. The data storage device according to claim 8, further comprising an address decoder which generates the first signal when it receives a prescribed address signal from said connector.

12. The data storage device according to claim 9, further comprising an address decoder which generates the first signal when it receives a prescribed address signal from said connector.

13. The data storage device according to claim 10, further comprising an address decoder which generates the first signal when it receives a prescribed address signal from said connector.

14. The data storage device according to claim 8, further comprising an address decoder which generates the second signal when it receives a prescribed address signal from said connector.

15. The data storage device according to claim 9, further comprising an address decoder which generates the second signal when it receives a prescribed address signal from said connector.

16. The data storage device according to claim 10, further comprising an address decoder which generates the second signal when it receives a prescribed address signal from said connector.

17. The data storage device according to claim 8, further comprising an address decoder which generates the first and second signal when it receives prescribed first and second address signals from said connector.

18. The data storage device according to claim 7, wherein said data storage device is an IC card, and the data processor main unit to be connected to said data storage device is a computer.

* * * * *